United States Patent [19]

Flintjer

[11] Patent Number: 4,669,421

[45] Date of Patent: Jun. 2, 1987

[54] CUTTLEBONE HOLDER

[76] Inventor: Ronald M. Flintjer, 6541 E. Webster Rd., Orchard Park, N.Y. 14127

[21] Appl. No.: 732,674

[22] Filed: May 10, 1985

[51] Int. Cl.⁴ .............................................. A01K 31/00
[52] U.S. Cl. ........................................................ 119/18
[58] Field of Search ................................ 119/18, 24, 26

[56] References Cited

U.S. PATENT DOCUMENTS

| 385,650 | 7/1888 | Wemple | 119/18 |
| 1,239,151 | 9/1917 | Woods | 119/18 |
| 2,773,473 | 12/1956 | Martin | 119/18 |
| 3,707,949 | 1/1973 | Lippi | 119/18 |
| 3,789,800 | 2/1974 | Steudler, Jr. | 119/18 |

Primary Examiner—Robert P. Swiatek
Attorney, Agent, or Firm—Joseph P. Gastel

[57] ABSTRACT

A one-piece molded plastic cuttlebone holder having two pairs of substantially parallel fingers with spaces therebetween for receiving wires of a cage, and third fingers extending laterally outwardly from one pair of fingers to define a cuttlebone receiving socket. Certain fingers of the spaced pairs of fingers are resilient so that they will provide a clamping force on the cage wires which are located between the pairs of fingers. The socket-forming fingers are mounted relative to the spaced pairs of fingers with a movable connection to accommodate cuttlebones of different sizes.

25 Claims, 7 Drawing Figures

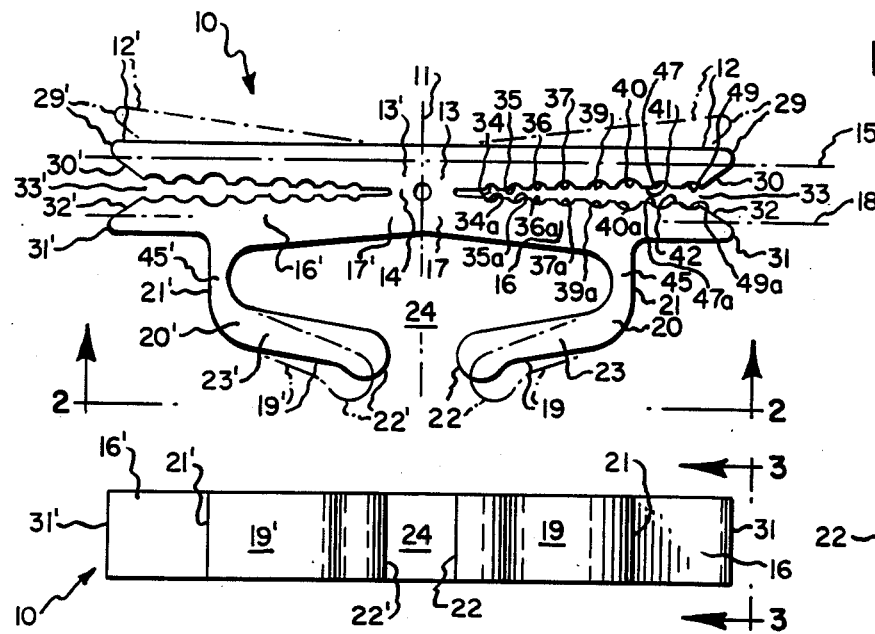

4,669,421

CUTTLEBONE HOLDER

BACKGROUND OF THE INVENTION

The present invention relates to an improved cuttlebone holder construction for mounting on bird cages.

As is well known, a caged bird requires a cuttlebone for proper nutrition. In the past a cuttlebone was secured to the side of a cage by means of a stamped metal bracket which had to be manually bent into clamping engagement with the cage wires and also bent into holding engagement with the cuttlebone. This was a task which required digital bending of the holder which not only required effort, but could also result in cut fingers because of the sharp edges on the holder. In addition, prior sharp metal holders could cause injury to birds and could rust.

SUMMARY OF THE INVENTION

It is one object of the present invention to provide an improved cuttlebone holder which can be installed on a cage in an extremely simple and expedient manner, and without requiring it to be formed to the specific size of the cuttlebone which it is to hold.

Another object of the present invention is to provide an improved cuttlebone holder which automatically locks in place incidental to the simple act of mounting it on the cage.

A further object of the present invention is to provide an improved cuttlebone holder which is automatically adjustable to different sizes of cuttlebones and which automatically fits on different sizes of cages.

Yet another object of the present invention is to provide an improved cuttlebone holder which is a simple molded plastic part which cannot cut the person installing it, or injure the birds, or rust. Other objects and attendant advantages of the present invention will readily be perceived hereafter.

The present invention relates to a cuttlebone holder comprising first finger means, second finger means, connecting means for connecting said first and second finger means in substantially parallel spaced relationship to clamp wires of a cage therebetween, and a socket connected to and extending laterally outwardly from said second finger means for receiving the end portion of a cuttlebone therein.

The various aspects of the present invention will be more fully understood when the following portions of the specification are read in conjunction with the accompanying drawings wherein:

BRIEF DESCRIPTION OF THE DRAWINGS

FIG. 1 is a plan view of the improved cuttlebone holder of the present invention;

FIG. 2 is a side elevational view taken substantially in the direction of arrows 2—2 of FIG. 1;

FIG. 3 is an end elevational view taken substantially in the direction of arrows 3—3 of FIG. 2;

FIG. 4 is a fragmentary side elevational view of the sides of the wires facing the inside of a cage and showing in dotted lines the initial position of the cuttlebone holder during installation onto the cage and further showing in solid lines the cuttlebone holder rotated in locking condition with the cage wires;

FIG. 5 is a view similar to FIG. 4, partially in cross section, showing the cuttlebone installed in the lower of two cuttlebone holders and showing how an upper cuttlebone holder is mounted on the upper end of the cuttlebone;

FIG. 6 is a view showing the cuttlebone in its final mounted position as held by two spaced cuttlebone holders; and FIG. 7 is a cross sectional view taken substantially along line 7—7 of FIG. 6.

DESCRIPTION OF THE PREFERRED EMBODIMENTS

The cuttlebone holder 10 is symmetrical about centerline 11 and therefore the parts to the right of centerline 11 in FIG. 1 will be denoted by unprimed numerals and their corresponding mirror image counterparts to the left of centerline 11 will be denoted by primed numerals.

The cuttlebone holder 10 is a molded plastic member, which may be fabricated of polyethylene or any other suitable plastic. Holder 10 has fingers 12 and 12' connected at their inner ends 13 and 13' to a connecting member 14 molded integrally therewith. In their normal unstressed condition, fingers 12,12' lie along axis 15. The cuttlebone holder 10 also includes fingers 16 and 16' having their inner ends 17 and 17' also integrally molded with connecting member 14. Fingers 16,16' are substantially parallel to fingers 12,12', and they lie along axis 18. Fingers 19 and 19' have their inner ends 20 and 20', respectively, connected to fingers 16 and 16', respectively, by connecting members 21 and 21', respectively, which are molded integrally with the fingers which they connect. The outer ends 22 and 22' of fingers 19 and 19', respectively, are spaced from each other as shown in FIG. 1. The central portions 23 and 23' of fingers 19 and 19', respectively, extend generally parallel to fingers 16 and 16' to which they are connected. Fingers 16, 16', 19 and 19' cooperate to form a socket 24 for receiving an end of a cuttlebone 25.

Two cuttlebone holders 10 are used to hold a cuttlebone in position on the wires 26 of a cage. A first cuttlebone holder is installed as shown in FIG. 4. The cuttlebone holder 10 is positioned vertically, as shown in dotted lines in FIG. 4 between two wires 26 of the cage, with fingers 12–12' located outside of the cage and fingers 16–16' located inside of the cage. The cuttlebone holder 10 is then pivoted in the direction of arrow 27 from the dotted line position of FIG. 4 to the solid line position shown therein.

The outer ends 29 and 29' of fingers 12 and 12', respectively, have inclined surfaces 30 and 30', respectively. The outer ends 31 and 31' of fingers 16 and 16', respectively, have inclined surfaces 32 and 32', respectively. Inclined surfaces 30 and 32 converge toward each other and inclined surfaces 30' and 32' also converge toward each other, as shown in FIG. 1. The converging surfaces facilitate the entry of wires 26 to the space 33 between fingers 12 and 16 and into the space 33' between fingers 12' and 16' as the holder 10 is pivoted in the direction of arrow 27.

A plurality of grooves 34, 35, 36, 37, 39 and 40 are formed in face 41 of finger 12. Grooves 34–40 extend substantially perpendicularly to the direction of axis 15. Grooves 34a, 35a, 36a, 37a, 39a and 40a are formed in face 42 of finger 16. Grooves 34–34a are located in opposition to each other. The same is true of grooves 35–35a, 36–36a, 37–37a, 39–39a and 40–40a. As can be seen from FIG. 1, the grooves 34 through 40 increase in size the further they are located from connecting member 14. Fingers 12' and 16' have corresponding grooves, which have not been numbered in the interest of clarity. The reason that the grooves increase in diameter in the above manner is because they are proportioned to receive therein wires of different diameter. In this respect, it will be understood that smaller cages have smaller diameter wires which are closer together and larger cages have larger diameter wires which are further apart. The ultimate objective is to have one or more pairs of opposed grooves, such as 34–34a, receive one or more wires 26 therein, with the wires so received holding the holder 10 in position because of a clamping force produced by the opposed finger pairs 12,16 and 12',16'. In this respect, it is to be noted that fingers 12 and 12' are flexible and resilient so that they can move from the solid line positions shown in FIG. 1 to the dotted line positions shown therein. Once these fingers have been moved away from their normal molded positions, their resilience produces a biasing force tending to return them to their solid line positions to thereby clamp wires 26 between them and their opposed fingers 16 and 16'. Grooves 47 and 49 are smaller than groove 40 and grooves 47a and 49a are smaller than groove 40a so that these grooves will provide a strong clamping force on cage wires therebetween. Instead of making the fingers 12 and 12' flexible and resilient, it will be appreciated that a flexible connection can be made at their inner ends 13 and 13', respectively, which will produce the same result. Also, if desired, fingers 16 and 16' can be made flexible and resilient.

After the lower cuttlebone holder 10 has been mounted in the position of FIG. 4, the cuttlebone 25 is inserted into socket 24. Thereafter a second cuttlebone holder 10' is oriented between wires 26 as shown in the vertical dotted line position of FIG. 5 and thereafter rotated in the direction of arrow 43 to the horizontal dotted line position wherein wires 26 are clamped between the finger pairs 12,16 and 12',16' as described above. The cuttlebone holder 10' is then moved vertically in the direction of arrows 44 so as to cause the upper end of the cuttlebone 25 to enter socket 24. The connecting members 21 and 21' have flexible narrow portions 45 and 45' which can serve as resilient hinges to permit fingers 19 and 19', respectively, to flex from the solid line positions of FIG. 1 to the dotted line positions shown therein, and to return to the solid line positions when the flexing forces are removed. This will insure a snug fit between the ends of cuttlebone 25 and holders 10 and 10'. However, it is not necessary that connecting members 21 be flexible because just receiving the ends of cuttlebone 25 in sockets 24 will be sufficient to hold it firmly in position. Furthermore, it will be appreciated that the ends 22 and 22' of fingers 19 and 19' need not be separated, but can be joined so as to provide a fixed socket, rather than one which is adjustable in size, as described above.

It can thus be seen that the improved cuttlebone holder of the present invention is manifestly capable of achieving the above enumerated objects, and while preferred embodiments have been disclosed, it will be appreciated that the present invention is not limited thereto but may be otherwise embodied within the scope of the following claims.

What is claimed is:

1. A one-piece molded plastic cuttlebone holder comprising two first aligned fingers having inner and outer ends, two second aligned fingers having inner and outer ends, said two first fingers being positioned in spaced substantially parallel relationship to said two second fingers, a connecting member molded integrally with said inner ends of said first and second fingers, openings between said outer ends of said first and second fingers, said first fingers being resilient to thereby cause said first fingers to be biased toward said second fingers when forces are applied to said first fingers to spread them away from said second fingers, third fingers having first and second end portion and central portions therebetween, second connecting members molded integrally with said second fingers intermediate said inner and outer ends thereof, said first end portions also being molded integrally with said second connecting members, said second end portions and said central portions of said third fingers extending toward each other and said second end portions being spaced from each other, and said second connecting members being flexible and resilient so as to bias said central portions and second end portions toward said second fingers when forces are applied for moving said second end portions and said central portions away from said second fingers.

2. A one-piece molded plastic cuttlebone holder as set forth in claim 1 wherein said first and second fingers have longitudinal axes, and wherein said first and second fingers have first and second faces, respectively, facing each other, and spaced grooves in said first and second faces, said first and second grooves extending in directions substantially perpendicularly to said longitudinal axes.

3. A one-piece molded plastic cuttlebone holder as set forth in claim 2 including facing inclined surfaces on said outer ends of said first and second fingers, said facing inclined surfaces converging toward each other as they extend inwardly from said outer ends of said first and second fingers toward said inner ends of said first and second fingers.

4. A one-piece molded plastic cuttlebone holder as set forth in claim 3 wherein said grooves increase in diameter as they progress outwardly away from said connecting member toward said outet ends of said first and second fingers.

5. A cuttlebone holder comprising first finger means, second finger means, connecting means for connecting said first and second finger means in substantially parallel spaced relationship to clamp wires of a cage therebetween, a socket connected to and extending laterally outwardly from said second finger means for receiving the end portion of a cuttlebone therein, said first finger means comprising two first fingers extending in alignment with each other, said second finger means comprising two second fingers extending in alignment with each other, said connecting means being located in an intermediate position between said two first fingers and in an intermediate position between said two second fingers, at least said first or said second fingers being resilient to produce a biasing force for biasing said first or second fingers, respectively, toward the other when forces are applied tending to pull them apart, said socket means comprising third and fourth fingers, first end portions on said third and fourth fingers, second connecting means connecting said third and fourth fingers to said second fingers intermediate said inner and outer ends thereof, and second end portions on said third and fourth fingers located in spaced facing relationship to each other.

6. A cuttlebone holder as set forth in claim 5 wherein said second connecting means include resilient hinge means, and wherein said third and fourth finger means include central portions between said first end portions and said second end portions, said central portions extending substantially parallel to said second finger means.

7. A cuttlebone holder as set forth in claim 5 wherein said second connecting means comprise integral connections between said first end portions and said second finger means.

8. A cuttlebone holder as set forth in claim 7 wherein said integral connections include resilient integral hinge means between said second connecting means and said first end portions of said third and fourth finger means.

9. A cuttlebone holder as set forth in claim 5 wherein said first and second finger means include first and second facing surfaces, respectively, and cage wire receiving grooves in said first and second facing surfaces for receiving cage wires which extend substantially perpendicularly to said first and second finger means.

10. A cuttlebone holder comprising first finger means, second finger means, connecting means for connecting said first and second finger means in substantially parallel spaced relationship to clamp wires of a cage therebetween, a socket connected to and extending laterally outwardly from said second finger means for receiving the end portion of a cuttlebone therein, said first and second finger means including first and second facing surfaces, respectively, and cage wire receiving grooves in said first and second facing surfaces for receiving cage wires which extend substantially perpendicularly to said first and second finger means, said wire-receiving grooves increasing in diameter as they progress outwardly from said connecting means.

11. A cuttlebone holder as set forth in claim 10 wherein said first finger means comprise two first fingers extending in alignment with each other, and wherein said second finger means comprise two second fingers extending in alignment with each other, and wherein said connecting means are located in an intermediate position between said two first fingers and in an intermediate position between said two second fingers.

12. A cuttlebone holder as set forth in claim 10 wherein at least said first or said second fingers are resilient to produce a biasing force for biasing said first or second fingers, respectively, toward the other when forces are applied tending to pull them apart.

13. A cuttlebone holder as set forth in claim 10 wherein said first finger means comprise two first fingers extending in alignment with each other, and wherein said second finger means comprise two second fingers extending in alignment with each other, and wherein said connecting means are located in an intermediate position between said first two fingers and in an intermediate position between said two second fingers.

14. A cuttlebone holder as set forth in claim 13 wherein at least said first or said second fingers are resilient to produce a biasing force for biasing said first or second fingers, respectively, toward the other when forces are applied tending to pull them apart.

15. A cuttlebone holder as set forth in claim 14 wherein said socket means comprises third and fourth fingers, first end portions on said third and fourth fingers, second connecting means connecting said first end portions of said third and fourth fingers to said second fingers intermediate said inner and outer ends thereof, and second end portions on said third and fourth fingers located in spaced facing relationship to each other.

16. A cuttlebone holder as set forth in claim 15 wherein said second connecting means comprise integral connections between said first end portions and said second finger means.

17. A cuttlebone holder as set forth in claim 16 wherein said integral connections include resilient integral hinge means between said second connecting means and said first end portions of said third and fourth finger means.

18. In a cage having spaced vertical wires, a cuttlebone holder assembly for securing opposite end portions of a cuttlebone having a longitudinal axis, comprising first and second completely separate cuttlebone holders each having first and second finger means, connecting means for connecting said first and second finger means in substantially parallel spaced relationship to clamp said spaced vertical wires of said cage therebetween, and a socket extending laterally outwardly from and connected relative to said first and second finger means thereof for each receiving an end portion of said cuttlebone, the sockets of said first and second holders each having an opening therethrough which openings are disposable in vertical alignment, one above the other, so that an axis through the socket parallels said wires and the cuttlebone axis and so that said cuttlebone is received and held in said sockets.

19. In a cage as set forth in claim 18 wherein said first or second fingers are secured in resilient relationship relative to each other through said connecting means for biasing said first or second fingers, respectively, toward the other when forces are applied tending to pull them apart.

20. In a cage having spaced vertical wires, a cuttlebone holder assembly for securing opposite end portions of a cuttlebone comprising first and second completely separate cuttlebone holders each having first and second finger means, connecting means for connecting said first and second finger means in substantially parallel spaced relationship to clamp said spaced vertical wires of said cage therebetween, and a socket extending laterally outwardly from and connected relative to said first and second finger means of each of said first and second cuttlebone holders for each receiving an end portion of said cuttlebone, said first finger means comprising two first fingers extending in alignment with each other, and said second finger means comprising two second fingers extending in alignment with each other, and said connecting means being located in an intermediate position between said two first fingers and in an intermediate position between said two second fingers.

21. In a cage as set forth in claim 20 including a plurality of cage wire receiving grooves in at least one of said first and second facing surfaces extending substantially parallel to each other and being oriented progressively outwardly from said connecting means and extending transversely to said socket means for receiving cage wires which extend substantially perpendicularly to said first and second finger means.

22. In a cage having spaced vertical wires, a cuttlebone holder assembly for securing opposite end portions of a cuttlebone comprising first and second completely separate cuttlebone holders each having first and second finger means, connecting means for connecting said first and second finger means in substantially parallel spaced relationship to clamp said spaced vertical wires of said cage therebetween, and a socket extending laterally outwardly from and connected relative to said first and second finger means of each of said first and second cuttlebone holders for each receiving an end portion of said cuttlebone, said socket being connected to said second finger means.

23. In a cage as set forth in claim 22 wherein said first finger means comprise two first fingers extending in alignment with each other, and wherein said second finger means comprise two second fingers extending in alignment with each other, and wherein said connecting means are located in an intermediate position between said two first fingers and in an intermediate position between said two second fingers.

24. In a cage having spaced vertical wires, a cuttlebone holder assembly for securing opposite end portions of a cuttlebone comprising first and second completely separate cuttlebone holders each having first and second finger means, connecting means for connecting said first and second finger means in substantially parallel spaced relationship to clamp said spaced vertical wires of said cage therebetween, and a socket extending laterally outwardly from and connected relative to said first and second finger means of each of said first and second cuttlebone holders for each receiving an end portion of said cuttlebone, and wherein said sockets each comprise third and fourth finger means, first end portions on said third and fourth finger means, second connecting means connecting said third and fourth finger means to said second finger means, and second end portions on said third and fourth finger means positioned in spaced relationship to each other.

25. A cuttlebone holder comprising first finger means, second finger means, connecting means for connecting said first and second finger means in substantially parallel spaced relationship to clamp wires of a cage therebetween, a socket connected to and extending laterally outwardly from said second finger means for receiving the end portion of a cuttlebone therein, said first and second finger means including first and second facing surfaces, respectively, and a plurality of cage wire receiving grooves in at least one of said first and second facing surfaces extending substantially parallel to each other and being oriented progressively outwardly from said connecting means and extending transversely to said socket means for receiving cage wires which extend substantially perpendicularly to said first and second finger means.

* * * * *